United States Patent [19]

Bell

[11] Patent Number: 4,807,417
[45] Date of Patent: Feb. 28, 1989

[54] WIRE HOLDING NAIL PLATE

[76] Inventor: Peter D. Bell, P.O. Box 788, Merrit Island, Fla. 32952

[21] Appl. No.: 77,457

[22] Filed: Jul. 24, 1987

[51] Int. Cl.[4] ............................................. E04B 1/38
[52] U.S. Cl. ...................................... 52/699; 248/71; 174/48
[58] Field of Search .............. 52/699, 221, 220; 411/461, 462, 463, 466; 174/48; 248/65, 71, 74.5, 546, 300

[56] References Cited

U.S. PATENT DOCUMENTS

| | | | |
|---|---|---|---|
| 1,968,596 | 7/1939 | Benander | 174/48 X |
| 2,317,825 | 4/1943 | Teas, Sr. | |
| 2,540,305 | 2/1951 | Tomlinson | 52/220 X |
| 3,240,869 | 8/1964 | Juriet | |
| 3,297,815 | 1/1967 | Drettmann | 174/48 |
| 3,350,501 | 10/1967 | Jureit | 174/48 X |
| 3,515,797 | 6/1970 | Hochstetler | 174/48 X |
| 3,553,346 | 1/1971 | Ballantyne | 174/48 |
| 3,689,681 | 9/1972 | Searer et al. | 174/48 |
| 4,472,860 | 9/1984 | Österlind | 248/65 X |

Primary Examiner—David A. Scherbel
Assistant Examiner—Creighton Smith
Attorney, Agent, or Firm—Dennison, Meserole, Pollack & Scheiner

[57] ABSTRACT

A nail plate including integral laterally projecting nailing prongs and, remote therefrom, a laterally directed hold-down flange. The area between the prongs and the flange is imperforate to define a shield for wiring and the like. The free outer edge of the flange may include a rolled portion defining an elongate sleeve.

6 Claims, 1 Drawing Sheet

WIRE HOLDING NAIL PLATE

BACKGROUND OF THE INVENTION

The invention relates to nail plates of the type used in building construction to protect electric wiring and like service lines against accidental damage.

More particularly, after the basic framework is assembled, for example a stud wall or a block wall, the electrical wiring is run along the surface thereof. In a conventional wood stud wall, this will normally entail a notching or recessing of the face edges of the studs for a recessed positioning of the wire therein. In order to protect the notch-received wire it is a common expedient to overlay each notch with a flat metal plate which is secured to the corresponding stud both above and below the notch, preferably by integral teeth or prongs struck from the plate. Thus, an effective protective means is provided against an accidental piercing of the wire by nails or the like as the wall-finishing panels are mounted. Similarly, the nail plates will effectively protect the wire against accidental damage by driven fasteners under a variety of other circumstances such as the wall-mounting of shelving, decorative or utilitarian articles, and the like.

An example of a conventional nail plate is illustrated in U.S. Pat. No. 3,280,869, J. C. Juriet, issued Mar. 15, 1966. This patent is of particular interest in detailing the need for and advantages derived from such nail plates.

The conventional nail plate, in addition to being used in conjunction with wood stud walls as the Juriet patent also is used on furred walls for similarly protecting electric wiring or the like. Such walls, normally formed of concrete block or poured concrete, have a series of thin wooden strips, furring strips, nailed thereto to provide a nailing base for wall-finishing panels and the like. The furring strips will normally include at least one horizontal base or sill strip with multiple vertical strips thereabove and at predetermined spacing, normally 16" in a conventional wall. The horizontal strip includes a continuous upper support edge or ledge extending laterally inward from the forward nailing surface. The vertical strips, at the lower ends thereof, are spaced slightly above the upper edge of the sill strip. In the conventional arrangement, a planar nail plate is nailed to the lower portion of each vertical strip and the horizontal strip therebelow to span the gap or recess therebetween and provide a barrier protecting the wire against any accidental penetration by a nail. This juncture point, as with the notches in the studs of Juriet, is particularly vulnerable in that surface paneling and the like is conventionally nailed along the vertical nailing surfaces, whether this be studs or furring strips.

In addition to the conventional nailing plate, in a furred wall it is necessary and in many instances required by building codes to specifically provide hold-down means to stabilize the wire on the narrow upper edge of the horizontal furring strip to avoid any tendency for the wire to shift. Such a hold-down is conventionally effected by using driven staples which span the wire and penetrate the strip to the opposite sides thereof. While the combination of the nail plates and staples effectively protects and retains the wiring, there is a substantial expenditure of labor in nailing both the nail plates and the staples, in addition to the problems of effectively driving the staples immediately adjacent the wall and into the narrow upper edge of the strip. A substantially greater problem is the tendency for the furring strips themselves to come loose from the wall when subjected to the combined forces required to both mount the nail plates and drive the staples. In other words, under actual working conditions, the wire is run, the nail plates nailed in position and the staples driven. The driving of the staples has a tendency to cause the nails mounting the furring strips to loosen within the block wall. This in turn requires a renailing of the furring strips either by the electrician installing the wiring or by the original installers of the furring strips. In either case, there is an undesireable and expensive waste of labor and time.

SUMMARY OF THE INVENTION

The present invention proposes a nail plate which combines the features of the conventional nail plate and staple in both effectively protecting the wire at furring strip junctures and fixedly positioning and retaining the wire on and against the edge of the wire-supporting furring strip. In addition, the nail plate of the invention is configured to effectively mount to a single furring strip, normally the sill strip, with a corresponding reduction in the nailing force required to mount the plate.

More specifically, the nail plate of the invention, formed of 16 gauge metal or the like, includes a planar face panel of a width approximating the width of a furring strip. The panel includes multiple nailing prongs struck therefrom and a full width integral laterally directed holding lip or flange. The flange is of a transverse depth slightly less than the depth of a furring strip.

In use, and after initially positioning the wire on the upper edge of the horizontal furring strip, the nail plate, in alignment with a corresponding vertical strip, is positioned with the holding flange over the wire. The nailing plate is then forceably downwardly held to tightly engage the wire against the furring strip edge, after which, and utilizing a hammer or the like, the face panel is struck, driving the prongs into the horizontal strip. The wire is thus both fully protected and securely retained. The positioning of the nail plates at each vertical furring strip, conventionally on 16"0 centers, will provide for a spacing of the hold-downs also on 16" centers, well within code requirements.

The nailing plate of the invention, formed and utilized as noted, eliminates the necessity for separate hold-down staples, combining the function of a conventional nail plate and hold-down staples into a single improved nail plate thus reducing material costs, labor and time, as well as the inherent problems conventionally arising from the use of separate hold-down staples in furring strips.

As a variation, the nail plate of the invention can include a reversely rolled sleeve integrally defined along the inner edge of the holding flange for television or telephone wires or the like. As desired and in order to reduce interference, the sleeve can be provided with internal insulation depending upon the nature of the wires extended therethrough.

DESCRIPTION OF PREFERRED EMBODIMENTS

Figure 1:
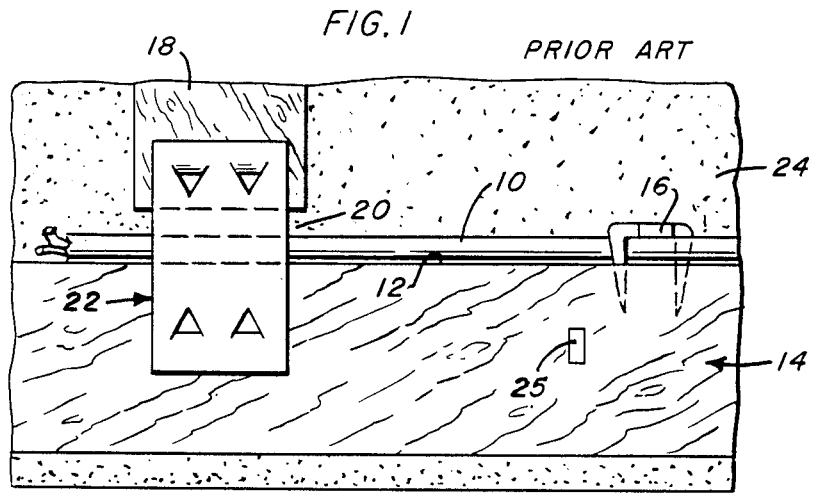
FIG. 1 is an elevational view of a prior art installation utilizing a planar nail plate fixed to both the horizontal and vertical furring strips across the received wire, and a separate hold-down staple.

FIG. 1 illustrates an installation in accord with the prior art. Basically, the wire 10 lies along the narrow upper edge or support ledge 12 of the horizontal base or sill furring strip 14 and is fixedly secured thereto and retained thereon by appropriately spaced driven staples 16. The lower ends of the vertical furring strips 18, only one being illustrated, terminate in space relation above the upper edge 12 of the sill strip 14 to define a wire-accomodating gap 20. The installation is completed by a planar nail strip 22 positioned vertically across the gap and nailed, as by means of integral nailing prongs, to the forward nailing surfaces of both the horizontal sill strip 14 and the corresponding vertical strip 18. Positioned in this manner, the plate 22 defines a protective overlay for the staple-secured wire against any possibility of accidental nail-piercing of the wire. The furring strips 14 and 18 themselves are secured to the block wall 24 by appropriate nails 25 or simliar driven fasteners.

Figure 2:
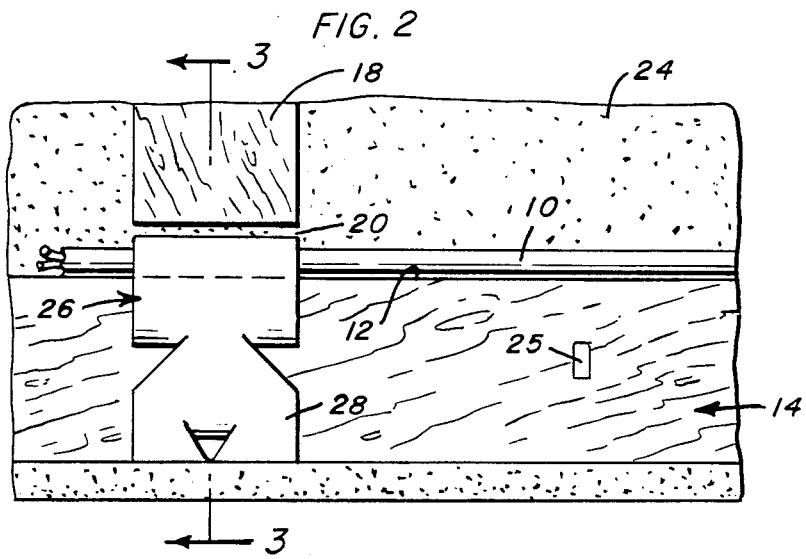
FIG. 2 is a front elevational view of an installation utilizing the nail plate of the present invention.
Figure 3:
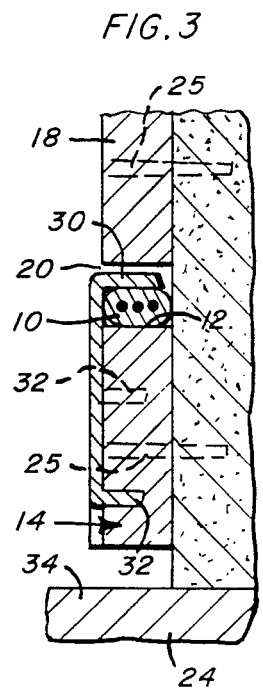
FIG. 3 is an enlarged cross-sectional view taken substantially on a plane passing along line 3-3 in FIG. 2.
Figure 4:
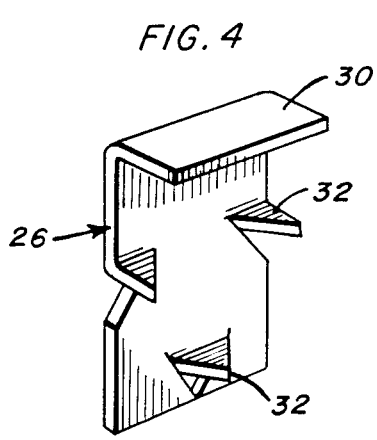
FIG. 4 is a perspective view of the nail plate of the invention.

The nail plate 26 of the present invention is, in its basic form, illustrated in FIGS. 2, 3 and 4. The plate 26 is formed from a single sheet of rigid metal, such as aluminum or galvanized steel, sufficiently thick to prevent accidental penetration by a driven fastener. The sheet is formed to provide a vertically elongate face panel 28 with a laterally directed full width holding lip or flange 30 integral at one end thereof.

The panel 28 includes a plurality of nailing prongs 32 cut therefrom and laterally turned toward the same side of the panel 28 as the holding flange 30 to define penetrating points. It is preferred that at least three such prongs 32 be provided for a positive non-shifting engagement with the horizontal furring strip 14 as illustrated in FIGS. 2 and 3.

The nail plate 26 is preferably of a width substantially equal to that of the vertical strips 18 to define a protective cover or barrier for the wire 10 across the full width of the wire-receiving gap 20 associated with each vertical strip 18. The height of the face panel 28 is to be such as to extend across at least a substantial portion of the vertical height of the horizontal furring strip 14, terminating sufficiently above the structure floor 34 to avoid interference with a complete retaining engagement of the nail plate 26 with a wire 10 to be retained thereby.

As will also be appreciated from FIGS. 2 and 3, the nailing prongs 32 are defined from the face panel 28 sufficiently below the holding flange 30 to ensure a completely imperforate section of face panel 28, and to define a solid nail barrier, below the flange 30 and of a height to accommodate wires 10 of different thickness wires.

In using the nail plate 26 of the invention, the wire 10 is positioned on the narrow upper edge 12 of the sill strip 14, lying within the defined gaps or recesses 20 immediately below the furring strips 18. The nail plate 26 is then positioned by engaging the holding flange or lip 39 thereof within the corresponding gap 20 and in overlying relation to the wire 10. The nail plate 26, after introduction into the gap 20, is downwardly shifted to snuggly position and retain the wire 10 against the upper edge 12, after which the nail plate 26 is fixed into position by an inward driving of the nailing prongs 32 into the nailing surface of base furring strip 14. This simplified procedure, involving merely a hooking of the flange 30 over the positioned wire, a downward drawing of the plate 26 and a nailing of the prongs to the strip 14, produces both a full protective enclosure for the wire and a positive fixing thereof in position. The protection and retention of the wire is effected without requiring additional fastener means such as staple 16 and with no disruptive impacting on the furring strips. It is to be appreciated that the flange 30 is such as to assure non-damaging engagement with the clamped wire 10.

As will be appreciated, the depths of the flange 30 and prongs 32 are slightly less than the thickness of the strip to which the plate is to be mounted to allow for full seating of the nailing prongs 32.

Figure 5:
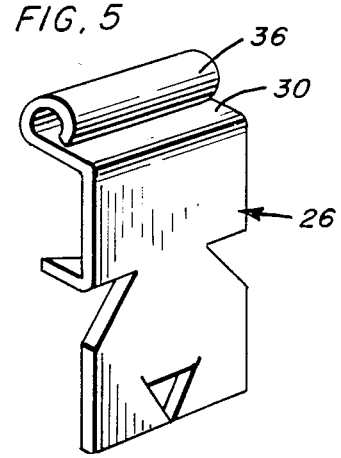
FIG. 5 is a perspective view of a variation of the nail plate of the invention.

FIG. 5 illustrates a variation of the nail plate 26 wherein the laterally directed holding flange 30 includes an integral upwardly and outwardly rolled extension 36 in the nature of a hollow sleeve. The formed sleeve, of a height to be accomodated in the furring strip gap 20, can, as desired, be used as a guide channel or conduit for telephone wire, television wires and the like. Depending upon the nature of the wires engaged through the sleeve 36, some form of electrical insulation therein may be required.

While the nail plate 26 has been described for use in conjunction with electrical wiring, the plate is equally adapted to protect and retain other forms of service lines, including plumbing lines, gas lines and the like, positioned in the manner detailed with regard to wire 10. Further, while the provision of integral nailing prongs or teeth 32 is greatly preferred for several reasons including lower cost and ease of positioning and mounting the plate 26 in a manner locking the wire into position, the face panel 28 of the plate can be provided with preformed apertures for receiving separately driven nails.

The foregoing is considered illustrative of the principles of the invention. Variations thereof, within the scope of the invention, may occur to those skilled in the art based on the teachings herein.

I claim:

1. A nail plate for shielding and retaining a service line positioned on a receiving edge extending laterally inward from a nailing surface, said nail plate comprising a planar face panel engageable against said nailing surface, fastener means for fixing said panel to said surface, said plate having a laterally inwardly directed planar holding flange integrally formed at one end of said panel for overlying and engaging a service line on and in retained engagement against said receiving edge, said fastener means being laterally spaced from said holding flange along said face panel, said face panel between said holding flange and said fastener means being imperforate and defining a nail barrier for an engaged service line.

2. The nail plate of claim 1 wherein said fastener means comprises laterally directed nailing prongs integrally formed from said face panel.

3. The nail plate of claim 2 wherein said holding flange includes an outer edge portion remote from said face panel outwardly rolled relative to the face panel and defining a wire-receiving sleeve.

4. A method of protectively enclosing and fixing a service line on a support surface adjacent and lateral of a nailing surface utilizing a nail plate with a planar face panel having a laterally directed holding flange; said method including the steps of positioning the service line on the support surface, positioning the holding flange over the service line, downwardly moving the nail plate to engage the holding flange against the service line and the service line against the support surface, and fixing the face panel to the nailing surface while retaining the service line against the support surface.

5. The method of claim 4 wherein the face panel is fixed to the nailing surface by driving fasteners into the nailing surface, said fasteners being integral with said face panel.

6. A wall system with mounted service lines comprising nail receiving support means, said support means defining a nailing surface and ledge means extending inwardly from said nailing surface, said support means including laterally spaced elongate parallel support members, said support members having a transversely aligned series of gaps defined thereby, said gaps defining said ledge means, a service line received in said gaps and on said ledge means, and a nail plate aligned with each gap and forming a protective retainer for the received service line; each nail plate comprising a planar face panel engaged against said nailing surface, fastener means fixing said panel to said nailing surface, said plate having a laterally inwardly directed holding flange formed at one end of said panel, said holding flange extending into the corresponding gap and both overlying said service line and engaging and retaining said service line against said ledge means, said face panel including a portion thereof between the fastener means and the holding flange which overlies said gap and confines the service line therein, said panel portion being imperforate and defining a barrier against penetration by a driven fastener.

* * * * *